(12) United States Patent
Phillips et al.

(10) Patent No.: US 8,048,558 B2
(45) Date of Patent: Nov. 1, 2011

(54) CYLINDRICAL NICKEL-ZINC CELL WITH NEGATIVE CAN

(75) Inventors: Jeffrey Phillips, La Jolla, CA (US);
Franz Josef Kruger, Frankenthal (DE);
Samaresh Mohanta, San Diego, CA (US); Sean Clinton, San Diego, CA (US); Ernest M. Rimanosky, San Diego, CA (US); Jason Zhao, Suisun City, CA (US); Cecilia Maske, San Diego, CA (US); Zheng Gang Fan, Shenzhen (CN)

(73) Assignee: PowerGenix Systems, Inc., San Diego, CA (US)

( * ) Notice: Subject to any disclaimer, the term of this patent is extended or adjusted under 35 U.S.C. 154(b) by 295 days.

(21) Appl. No.: 12/411,282

(22) Filed: Mar. 25, 2009

(65) Prior Publication Data

US 2009/0233159 A1    Sep. 17, 2009

Related U.S. Application Data

(63) Continuation-in-part of application No. 11/116,113, filed on Apr. 26, 2005.

(60) Provisional application No. 61/041,891, filed on Apr. 2, 2008.

(51) Int. Cl.
*H01M 2/02* (2006.01)
*H01M 2/00* (2006.01)
*H01M 6/04* (2006.01)
*H01M 2/12* (2006.01)

(52) U.S. Cl. ........ 429/166; 429/164; 429/163; 429/178; 429/53; 429/188

(58) Field of Classification Search .................. 429/166, 429/164, 163, 178, 53, 188
See application file for complete search history.

(56) References Cited

U.S. PATENT DOCUMENTS

| 3,089,856 A | 5/1963 | Cyr et al. |
| 3,287,164 A | 11/1966 | Arrance |
| 3,287,166 A | 11/1966 | Arrance |
| 3,348,976 A | 10/1967 | Francis et al. |
| 3,432,351 A | 3/1969 | Davee et al. |
| 3,558,356 A | 1/1971 | Jost |
| 3,669,746 A | 6/1972 | Devitt et al. |
| 3,870,564 A | 3/1975 | Takamura et al. |

(Continued)

FOREIGN PATENT DOCUMENTS

CN    1271971 A    11/2000

(Continued)

OTHER PUBLICATIONS

CN Second Office Action dated Nov. 2, 2010, from CN Appl. No. 200910150533.7.

(Continued)

*Primary Examiner* — Helen O Conley
(74) *Attorney, Agent, or Firm* — Weaver Austin Villeneuve & Sampson LLP

(57) ABSTRACT

A nickel-zinc battery cell is formed with a negative can, a positive cap, and a jelly roll of electrochemically active positive and negative materials within. The inner surface of the can is protected with an anticorrosive material that may be coated or plated onto the can. Good electrical contact between the jelly roll and the cap is achieved through folding the nickel substrate over to contact a positive current collection disk.

18 Claims, 7 Drawing Sheets

U.S. PATENT DOCUMENTS

| | | | |
|---|---|---|---|
| 3,898,099 | A | 8/1975 | Baker et al. |
| 3,923,544 | A | 12/1975 | Berchielli |
| 3,951,687 | A | 4/1976 | Takamura et al. |
| 4,017,665 | A | 4/1977 | Sandera et al. |
| 4,037,033 | A | 7/1977 | Takamura et al. |
| 4,091,181 | A | 5/1978 | Merritt, Jr. |
| 4,118,860 | A | 10/1978 | Buckler et al. |
| 4,130,696 | A | 12/1978 | Gunther |
| 4,273,841 | A | 6/1981 | Carlson |
| 4,304,828 | A | 12/1981 | Vaidyanathan |
| 4,327,157 | A | 4/1982 | Himy et al. |
| 4,332,867 | A | 6/1982 | Tsuda et al. |
| 4,364,422 | A | 12/1982 | Brown et al. |
| 4,552,821 | A | 11/1985 | Gibbard et al. |
| 4,554,227 | A | 11/1985 | Takagaki et al. |
| 5,124,120 | A | 6/1992 | Sklarchuck et al. |
| 5,215,836 | A | 6/1993 | Eisenberg |
| 5,455,128 | A | 10/1995 | Tanaka |
| 5,462,820 | A | 10/1995 | Tanaka |
| 5,521,021 | A * | 5/1996 | Alexandres et al. |
| 5,545,492 | A | 8/1996 | Zito |
| 5,604,054 | A * | 2/1997 | Ekern et al. .................... 429/166 |
| 5,607,796 | A | 3/1997 | Jacus et al. |
| 5,626,988 | A | 5/1997 | Daniel-Ivad et al. |
| 5,707,756 | A | 1/1998 | Inoue et al. |
| 5,721,072 | A | 2/1998 | Mototani et al. |
| 5,741,606 | A * | 4/1998 | Mayer et al. |
| 5,766,789 | A | 6/1998 | James et al. |
| 5,773,176 | A | 6/1998 | Serenyi |
| 5,804,334 | A | 9/1998 | Yamamura et al. |
| 5,856,040 | A | 1/1999 | Newman et al. |
| 5,863,676 | A | 1/1999 | Charkey et al. |
| 5,972,534 | A * | 10/1999 | Pasquier |
| 6,025,094 | A | 2/2000 | Visco et al. |
| 6,287,719 | B1 * | 9/2001 | Bailey |
| 6,287,720 | B1 | 9/2001 | Yamashita et al. |
| 6,368,365 | B1 | 4/2002 | Chi et al. |
| 6,372,380 | B1 | 4/2002 | Kitami et al. |
| 6,617,072 | B2 | 9/2003 | Venkatesan et al. |
| 6,620,543 | B2 * | 9/2003 | Li .................................. 429/53 |
| 6,653,017 | B2 | 11/2003 | Satoh et al. |
| 6,740,446 | B2 | 5/2004 | Corrigan et al. |
| 6,787,265 | B2 | 9/2004 | Phillips |
| 6,790,559 | B2 | 9/2004 | Phillips |
| 6,797,433 | B2 | 9/2004 | Phillips |
| 6,801,017 | B2 | 10/2004 | Phillips |
| 6,811,929 | B2 * | 11/2004 | Phillips |
| 6,818,350 | B2 | 11/2004 | Phillips |
| 6,835,499 | B2 | 12/2004 | Phillips |
| 6,949,310 | B2 | 9/2005 | Phillips |
| 7,550,230 | B2 | 6/2009 | Phillips et al. |
| 7,820,330 | B2 * | 10/2010 | Iwakura et al. |
| 2002/0022175 | A1 | 2/2002 | Hallifax et al. |
| 2002/0164530 | A1 * | 11/2002 | Iwakura et al. |
| 2002/0182501 | A1 | 12/2002 | Phillips |
| 2003/0017390 | A1 | 1/2003 | Probst et al. |
| 2003/0113630 | A1 | 6/2003 | Kainthla et al. |
| 2004/0157120 | A1 | 8/2004 | Wu et al. |
| 2004/0185329 | A1 | 9/2004 | Kainthla et al. |
| 2005/0003270 | A1 | 1/2005 | Phillips |
| 2005/0048363 | A1 * | 3/2005 | Gordon et al. ................ 429/161 |
| 2005/0064292 | A1 | 3/2005 | Phillips |
| 2006/0207084 | A1 | 9/2006 | Phillips et al. |
| 2006/0240317 | A1 | 10/2006 | Phillips et al. |
| 2008/0163478 | A1 * | 7/2008 | Phillips et al. |
| 2008/0166632 | A1 | 7/2008 | Phillips et al. |
| 2009/0233159 | A1 | 9/2009 | Phillips et al. |
| 2010/0291439 | A1 * | 11/2010 | Phillips et al. |
| 2011/0033747 | A1 * | 2/2011 | Phillips et al. |
| 2011/0039139 | A1 * | 2/2011 | Phillips et al. |
| 2011/0059343 | A1 * | 3/2011 | Mckinney et al. |

FOREIGN PATENT DOCUMENTS

| | | |
|---|---|---|
| CN | 1076882 | 12/2001 |
| CN | 1434534 | 6/2003 |
| CN | 2632866 | 8/2004 |
| CN | 21134449 Y | 10/2008 |
| CN | 201466140 Y * | 5/2010 |
| CN | 101777671 A * | 7/2010 |
| EP | 0833397 | 4/1976 |
| EP | 0457354 | 11/1991 |
| EP | 0697746 | 2/1996 |
| EP | 0755087 | 1/1997 |
| EP | 1819002 | 8/2007 |
| FR | 2 415 882 | 8/1979 |
| FR | 2 796 496 | 7/1999 |
| JP | 60167264 | 3/1985 |
| JP | 61-039452 | 2/1986 |
| JP | 06 283194 | 10/1994 |
| JP | 07-502375 | 3/1995 |
| JP | 07296813 | 11/1995 |
| JP | 11-167933 | 6/1999 |
| WO | WO93/26056 | 12/1993 |
| WO | WO 00/30192 | 5/2000 |
| WO | WO 00/36686 | 6/2000 |
| WO | WO/0118897 | 3/2001 |
| WO | WO 02/39517 | 5/2002 |
| WO | WO 02/39520 | 5/2002 |
| WO | WO 02/39521 | 5/2002 |
| WO | WO 02/39534 | 5/2002 |
| WO | WO0239534 | 5/2002 |
| WO | WO 02/075830 * | 9/2002 |
| WO | WO02075825 | 9/2002 |
| WO | WO03088381 | 10/2003 |
| WO | WO03088384 | 10/2003 |
| WO | 2005/020353 | 3/2005 |
| WO | WO 2006/116496 * | 11/2006 |

OTHER PUBLICATIONS

CN Third Office Action dated Jan. 8, 2010, from CN Appl. No. 200680013711.6.
JP Office Action dated Oct. 26, 2010, from JP Appl. No. 2006-524020.
US Notice of Allowance dated Jul. 15, 2010, from U.S. Appl. No. 10/921,062.
US Non-Final Office Action dated Sep. 15, 2010, from U.S. Appl. No. 11/116,113.
CN Final Office Action dated Dec. 21, 2010, from CN Appl. No. 200680013711.6.*
CN Third Office Action dated Nov. 22, 2010, from CN Appl. No. 200680014124.9.*
US Non-Final Office Action dated Dec. 22, 2010, from U.S. Appl. No. 12/900,206.*
US Final Office Action dated Feb. 25, 2011, from US Appl. No. 11/116,113.*
English Abstract of JP Appl. No. JP 61-039452, dated Feb. 28, 2008.
CN Office Action dated Mar. 11, 2010, from CN Appl. No. 200910150533.7.
CN Second Office Action dated Feb. 25, 2010, from CN Appl. No. 200680014124.9.
US Final Office Action dated May 14, 2010, from U.S. Appl. No. 10/921,062.
US Non-Final Office Action dated Oct. 1, 2009, from U.S. Appl. No. 11/367,028.
US Non-Final Office Action dated Dec. 24, 2008, from U.S. Appl. No. 11/978,209.
US Final Office Action dated Nov. 13, 2009, from U.S. Appl. No. 11/116,113.
English Abstract of JP Appl. No. JP 61-039452, dated Feb. 28, 2008.
CN Office Action dated Mar. 11, 2010, from CN Appl. No. 200910150533.7.
CN Second Office Action dated Feb. 25, 2010, from CN Appl. No. 200680014124.9.
US Final Office Action dated May 14, 2010, from U.S. Appl. No. 10/921,062.
US Non-Final Office Action dated Oct. 1, 2009, from U.S. Appl. No. 11/367,028.
US Non-Final Office Action dated Dec. 24, 2008, from U.S. Appl. No. 11/978,209.
US Final Office Action dated Feb. 17, 2010, from U.S. Appl. No. 11/978,213.

US Final Office Action dated Nov. 13, 2009, from U.S. Appl. No. 11/116,113.
US Office Action, dated May 13, 2011, issued in U.S. Appl. No. 12/903,004.
US Final Office Action, dated Jun. 13, 2011, issued in U.S. Appl. No. 12/900,206.
Office Action dated Oct. 16, 2009 for U.S. Appl. No. 10/921,062.
Office Action dated Nov. 7, 2008 for Chinese Application No. 200680013711.6.
Office Action dated Feb. 27, 2009 for Chinese Application No. 200680014124.9.
Examination Report dated Apr. 21, 2009 for European Application No. 04781526.1.
Office Action dated Jun. 5, 2009 for Chinese Application No. 200680013711.6.
PowerGenix Systems, Inc. "PSI-A Supplier of battery, super capacitor and power systems solutions" from website www.powergenix.com, Aug. 10, 2002.
PowerGenix Systems, Inc. "Next Generation Rechargeable Batteries" Aug. 4, 2003.
PCT Search Report, PCT/US2004/026859, dated Feb. 18, 2005.
PCT Written Opinion, PCT/US2004/026859, dated Feb. 18, 2005.
Jindra "Sealed Ni-Zn cells 1996-1998" Journal of Power Sources, vol. 88, No. 2, Jun. 2000.
Phillips et al., "Nickel Zinc Battery Design," U.S. Appl. No. 11/116,113 filed Apr. 26, 2005.
Jindra "Sealed Ni-Zn cells-1991-1995" Journal of Power Sources, vol. 66, 1997.
Coates et al., "Development of the nickel-zinc battery for commercial applications", Battery conference on Applications and Advances, 2000.
Pavlov et al., "Nickel-zinc batteries with long cycle life", Journal of Power Sources, vol. 62, No. 1, Sep. 1996.
Phillips et al., "Electrolyte Composition for Nickel-Zinc Batteries," U.S. Appl. No. 11/346,861, filed Feb. 1, 2006.
PCT International Search Report dated Nov. 23, 2006, from related International Application No. PCT/US2006/007390.
PCT International Search Report dated Jan. 26, 2007, from related International Application No. PCT/US2006/007390.
Binder et al., "Corrosion Studies of Zinc Electrode Current Collector," Electrochemical Society Proceedings, vol. 95-14, pp. 48-65, 1996.
PCT International Search Report dated Oct. 25, 2006; App. #PCT/US 2006/015807.
PCT Written Opinion dated Oct. 25, 2006; App. #PCT/US2006/015807.
Office Action from Chinese Application No. 200480030693.3, dated Nov. 16, 2007.
"Long Life Sealed Nickel-Zinc Cell Using a New Separator", Journal of Power Sources, 9 (1983) pp. 147-159.
English language Abstract of Chinese Patent No. 143454A, downloaded on Dec. 21, 2007 from www.delphion.com.
European Office Action dated May 8, 2006 for European Application No. 04781526.1.
European Office Action dated Feb. 26, 2008 for European Application No. 06736671.6.
Chinese Office Action dated May 23, 2008 for Chinese Application No. 200480030693.3.
Chinese Office Action dated Sep. 12, 2008, for Chinese Application No. 200480030693.3.
Office Action dated Mar. 18, 2008 for U.S. Appl. No. 10/921,062.
Office Action dated Sep. 5, 2008 for U.S. Appl. No. 10/921,062.
Office Action dated Feb. 20, 2009 for U.S. Appl. No. 10/921,062.
Office Action dated Aug. 20, 2008 for U.S. Appl. No. 11/978,213.
Final Office Action dated Apr. 28, 2009 for U.S. Appl. No. 11/978,213.
Office Action dated Aug. 13, 2009 for U.S. Appl. No. 11/978,213.
European Office Action dated Apr. 25, 2008 for European Application No. 06758626.3.
Office Action dated May 1, 2009 for U.S. Appl. No. 11/116,113.
International Search Report and Written Opinion dated Jun. 19, 2009 for Application No. PCT/US2009/038116.
Chinese Abstract for China Publication No. CN21134449Y, published Oct. 15, 2008.

* cited by examiner

CYLINDRICAL NICKEL-ZINC CELL WITH NEGATIVE CAN

CROSS-REFERENCE TO RELATED APPLICATIONS

This application claims priority under U.S.C. §119 to provisional application 61/041,891, titled "Cylindrical Nickel-Zinc Cell With Negative Can," filed on Apr. 2, 2008, and under U.S.C. §120 to application to 11/116,113, titled "Nickel Zinc Battery Design," filed Apr. 25, 2005, the disclosures of which are incorporated herein in their entireties for all purposes.

FIELD OF INVENTION

This invention pertains generally to nickel-zinc batteries. More specifically, this invention pertains to the physical design and construction of a cylindrical nickel-zinc cell.

BACKGROUND

The recent trend for portable devices has increased the needs and requirements for environmentally friendly rechargeable batteries suitable for use for consumers as a replacement to primary, or not rechargeable, batteries. A conventional rechargeable alkaline battery, e.g., nickel-metal hydride or nickel cadmium, has a negative can and a positive cap. Cylindrical nickel-zinc cells may be designed with polarities in reverse or opposite of a conventional alkaline battery. In the reverse polarity design, the battery vent cap is the negative terminal and the cylindrical case or can is the battery positive terminal. The reverse polarity design provides low impedance and low hydrogen evolution at the negative terminal. When employed in electricity powered portable devices, such as power tools, the reverse polarity design does not affect the consumer, because the rechargeable battery may be built into the device or be separately wrapped or encased. However, when the cells are individually supplied, a consumer may possibly mishandle a reverse polarity cell and cause damage to the cell or equipment by using or charging a reverse polarity cell as a conventional polarity cell.

In order to make available individual cells to mass consumers, a conventional polarity cell design for a nickel-zinc cell is sought that provides good impedance and hydrogen recombination at the negative terminal.

SUMMARY OF THE INVENTION

A nickel-zinc battery cell is formed with a negative can, a positive cap, and a jelly roll of electrochemically active positive and negative materials within. The inner surface of the can is protected with an anticorrosive material that may be coated or plated onto the can. Good electrical contact between the jelly roll and the cap is achieved through folding the nickel substrate over to contact a positive current collection disk.

In one aspect, the present invention pertains to a battery cell that includes a can, a negative current collector disk on the bottom of the can, a jelly roll on top of the negative current collector disk, a positive current collector disk on top of the jelly roll, and a vent assembly connected to the current collector disk but electrically insulated from the can. The cell is sealed at the interface between the vent assembly and the edge of the can. The can includes a bottom and a cylindrical side. The can includes an anticorrosive material. The negative current collector disk is in electrical contact with the can. The jelly roll includes a positive electrode, a negative electrode, and one or more separators in between. The negative electrode is in electrical contact with the negative current collector disk, and the positive electrode is in electrical contact with the positive current collector disk. The vent assembly is disposed on top of the positive current collector disk.

An anticorrosive material as part of the cell is included either as part of the can or a separate element. As part of the can the anticorrosive material may be the composition of the can itself or a coating or plated on at least the inner surface of the can. The coating may be painted on or otherwise applied using techniques such as welding, cladding, or other adhesive techniques. The material may also be plated onto the inner surface of the can either by electroplating or electroless plating. The anticorrosive material may be copper, tin, copper/tin alloy, zinc, silver, conductive carbon, brass, or combinations of these. In one embodiment, the anticorrosive material is conductive carbon paint that is coated or sprayed onto the can. In other embodiments, the anticorrosive material is plated tin or plated bi-layer of tin and copper. In still other embodiments, the anticorrosive material is plated zinc, copper, or silver. Other examples include having a can with composition of substantially, e.g., more than 50%, preferably more than 75%, of copper, zinc, tin, or brass. As a separate element, the anticorrosive material may be a metal sheet, foil or separator that circumferentially envelops the jelly roll. The anticorrosive material may be attached to the jelly roll or the can.

An anticorrosive material is required because the zinc negative electrode material contacts the negative can for better electrical and thermal conduction. However, as mentioned above, a corrosive reaction between zinc and the can material can cause damage to the cell.

Anticorrosive material may also be a part of the negative current collector. The anticorrosive material of the negative current collector may be the same material as the anticorrosive collector of the can, or different materials. Generally, methods of attaching or applying the anticorrosive material to the can are also applicable to the current collector.

These and other features and advantages are discussed further below with reference to associated drawings.

DETAILED DESCRIPTION OF THE PRESENT INVENTION

Figure 1:
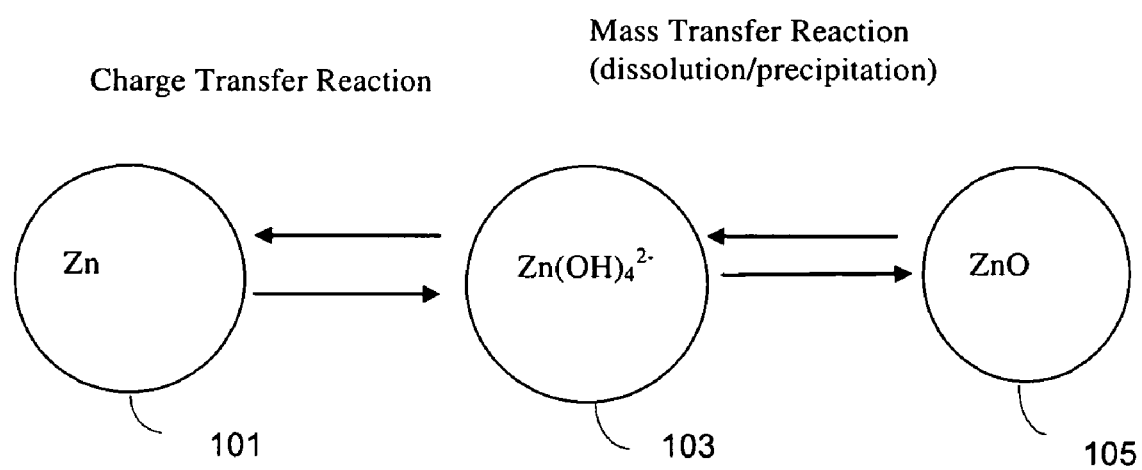
FIG. 1 is a diagram of charge transfer and mass transfer reactions in the Zn electrode.

Embodiments of the present invention are described herein in the context of design and manufacturing a nickel-zinc cell. Those of ordinary skill in the art will realize that the following detailed description of the present invention is illustrative only and is not intended to be in any way limiting. Other embodiments of the present invention will readily suggest themselves to such skilled persons having the benefit of this disclosure. For example, anticorrosion material may be applied to the inside of the cell can using other procedures.

Reference will be made in detail to implementations of the present invention as illustrated in the accompanying drawings. In this application, the terms "battery" and "cell" may be used interchangeably, such use should be clear from the context of the discussion.

Introduction

The recent trend for portable devices has increased the needs and requirements for environmentally friendly rechargeable batteries suitable for use for consumers as a replacement to primary, or not rechargeable, batteries. Nickel zinc batteries are environmentally friendly, but are supplied in a reverse polarity format to for low impedance and hydrogen evolution. When the cells are individually supplied, a consumer may possibly mishandle a reverse polarity cell and cause damage to the cell or equipment by using or charging a reverse polarity cell as a conventional polarity cell.

One solution for the consumer is to manufacture a reverse polarity cell that resembles a conventional polarity cell at standard consumer sizes, e.g., AA, AAA, C, and D. A bottom of a positive can may be made to look like a positive cap by stamping out a button. A negative cap may be made flat to look like a bottom of a negative can. However, this solution reduces the volume available for electrochemically active material inside the can. The button stamped out on the bottom would have only cosmetic purpose. The volume of the button is not used toward any cell function. Hiding a vent cap at the negative terminal below a flat surface also adds volume that is not used toward cell function. The net impact is a reduction in the volume available for electrochemical reactions. The actual cell would have to be shorter than that of a standard cell to fit such a configuration. The size reduction would reduce or eliminate the one of the advantages of the Ni—Zn cell over other cell types-more energy for the same size cell.

The present invention is a battery cell design using conventional polarity (positive cap and negative can) that avoids some of the original rationale for the reverse polarity design and yet obtains other advantages. Using a conventional polarity also avoids the reduction in cell energy associated with cosmetic redesigning of a reverse polarity cell. In certain embodiments, battery cells of this invention are nickel-zinc batteries.

In one aspect, the present invention pertains to a battery cell that includes a can, a negative current collector disk on the bottom of the can, a jelly roll on top of the negative current collector disk, a positive current collector disk on top of the jelly roll, and a vent assembly connected to the current collector disk but electrically insulated from the can. The cell is sealed at the interface between the vent assembly and the edge of the can.

An anticorrosive material as part of the cell is included either as part of the can or a separate element. As part of the can the anticorrosive material may be the composition of the can itself or a coating or plated on at least the inner surface of the can. The coating may be painted on or otherwise applied using techniques such as welding, cladding, or other adhesive techniques. The material may also be plated onto the inner surface of the can either by electroplating or electroless plating. In some cases, the material may be treated after application to the can, for example, baking (at about 260° C. or higher) or chemical cleaning. The anticorrosive material may be copper, tin, copper/tin alloy, zinc, silver, conductive carbon, brass, or combinations of these. In one embodiment, the anticorrosive material is conductive carbon paint. In other embodiments, the anticorrosive material is plated tin or plated bi-layer of tin and copper. In still other embodiments, the anticorrosive material is plated zinc, copper, or silver. Other examples include having a can with composition of substantially, e.g., more than 50%, preferably more than 75%, of copper, zinc, tin, or brass. As a separate element, the anticorrosive material may be a metal sheet, foil, or non-wettable polymer or separator that circumferentially envelops the jelly roll. The anticorrosive material may be attached to the jelly roll or the can.

The non-wettable polymer or separator may be hydrophobic polymer sheets. While any hydrophobic polymer may be used, a microporous membrane such as a polyolefin having a porosity of between about 30 and 80, and an average pore size of between about 0.005 and 0.3 micron will be suitable. A non porous sheet will also be effective. The non-wettable separator may be added as an extension of the separator in the jellyroll that would wind past the end of the negative electrode between the jellyroll and the can. The non-wettable polymer may also be added as a separate wrap around the jellyroll.

The conductive carbon paint may be a conductive graphite coating. Typically, it is water based and resistant to KOH. It is believed to reduce corrosion and oxidation of nickel plated steel and improve electrical contact between the cathode can and electrolyte. One suitable source for this material is Acheson Industries of Madison Heights, Mich. The conductive carbon is applied thinly and evenly to achieve the noted benefits. A typical application may include stamping or brushing the bottom of the can at the negative current collector disk, including the wiper assembly. The side of the can may be sprayed or brushed with the paint. After painting, the material may be dried for a time at an elevated temperature, for example, for 30 minutes at about 70° C.

An anticorrosive material is required because the zinc negative electrode material contacts the negative can for better electrical and thermal conduction. However, as mentioned above, a corrosive reaction between zinc and the can material can cause damage to the cell. Thus the material to which the zinc active material contacts at the can is selected carefully to avoid such a reaction. The inventors unexpectedly found that plated can from different vendors performed differently. Particularly, the battery cells made from plating by Shenzhen Longgang PingShan Gaohengsheng Company in Shenzhen, China, were found to have good properties. The process involves degreasing using an alkaline solution, cleaning with water three times, washing with acid, cleaning water three times, cleaning with deionized water once, plating a layer of copper using an alkaline electrolyte, cleaning with water three times, cleaning with deionized water once, plating a layer of tin using an electrolyte containing sulfate, cleaning with water three times, cleaning with deionized water, and drying.

It is believed that plating with good uniformity (overall regions of the can) may be achieved with a plating chemistry that has a higher throwing power. When electroplating an inside surface of a can, the area around the electrodes tend to accumulate more plated material than area further away. Using very conductive electrolytes reduces this non-uniformity. Plating on metal sheets before they are manufactured into cans or using electroless plating are different ways to increase uniformity.

Another way to protect the can and jelly roll against corrosive reactions is to ensure enough tin is plated such that the minimum thickness at any one location on the can surface is sufficiently high, e.g., between about 3-20 μm.

Other considerations for the anticorrosive material include costs both in material and manufacturing. Thus more expensive coating methods or material may not be feasible if the total cost of the battery cell increases by a large amount.

A negative current collector disk is placed at the bottom of the can. The negative current collector disk is typically made of copper, but may be other materials compatible with the negative electrode. In one embodiment, the negative current collector disk is a copper foam disk or expanded metal. In some embodiments, the negative current collector disk is also coated or plated with an anticorrosive material. This anticorrosive material may be the same material as the inner surface of the can or a different material. Additionally, the entire negative current collector disk may be made of an anticorrosive material such as copper, tin, copper/tin alloy, zinc, silver, conductive carbon, brass, and combinations of these.

In certain embodiments, a spring mechanism may be added between the bottom of the can and the negative current collector disk. The spring mechanism may be in the form of an o-ring compatible with the alkaline electrolyte or a metal formed with some tension. The spring mechanism absorbs shock and vibration during battery operation, such as in a power tool and also during handling, such as accidental dropping of the battery. When the spring mechanism absorbs the impact, other cell components, e.g., the negative current collector disk or the jelly roll, would not deform. In some embodiments, this spring mechanism may be a part of the negative current collector disk (e.g., one or more bent tabs cut into the disk) and/or be connected to the can by welding or other attachment techniques.

A jelly roll is positioned on top of the negative current collector disk. The jelly roll includes a positive electrode, a negative electrode, and one or more separators in between. Composition and manufacture of the negative electrodes are disclosed in U.S. patent application Ser. No. 10/921,062 (J. Phillips), filed Aug. 17, 2004 (low carbonate zinc electrode); PCT Publication No. WO 02/39517 (J. Phillips); PCT Publication No. WO 02/039520 (J. Phillips); PCT Publication No. WO 02/39521; PCT Publication No. WO 02/039534 and (J. Phillips); and, US Patent Publication No. 2002182501, each of the above incorporated herein by reference in their entireties for all purposes. Composition and manufacture of the positive electrodes are disclosed in the following documents, each of which is incorporated herein by reference in its entirety for all purposes: PCT Publication No. WO 02/039534 (J. Phillips) (co-precipitated $Ni(OH)_2$, CoO and finely divided cobalt metal) and (J. Phillips) US Patent Publication No. 20020192547 filed Mar. 15, 2002 (fluoride additives). The overall nickel zinc battery design is disclosed in U.S. patent application Ser. No. 11/116,113, which is also incorporated herein by reference in its entirety for all purposes.

The jelly roll is formed from the cut electrodes and separator sheets described above. Negative electrode and positive electrode are separated by one or more sheets of separators. The separators may be a number of different compositions and may be composite sheets of different material serving different purposes such as wetting and providing a barrier to dendrite growth while allowing ionic exchange. A winding apparatus draws the various sheets in at the same time and rolls them into the jellyroll-like structure. After a cylinder of sufficient thickness is produced, the apparatus cuts the layers of separator and electrodes to produce the finished jelly roll. A hollow core extends through the center of the jelly roll. The radius and shape of the core may be controlled by the winding tool which holds the sheets of electrode and separator during winding.

The outer layer of the jelly roll as wound is preferably the negative zinc electrode. The zinc active material is typically provided in excess of the nickel active material. The zinc active material is also less costly. In a reverse polarity design, an additional layer of separator between the can and the zinc active material is required to insulate the positive can from the negative electrode. However, in a conventional polarity design, the outer layer and the can have the same polarity and the additional layer of separator may not be needed if the anti-corrosive component of the can is sufficient. The elimination of an outer separator increases available volume in the can for electrochemically active material and reduce cost by using less separator material.

In certain embodiments, however, a layer of separator material may still be used between the can and the zinc active material. When this layer is hydrophobic it provides additional anti-corrosive properties. It is believed that using the hydrophobic separator lengthens the electrolyte pathway to the extent that it effectively decouples the can and the jellyroll electrically and thus prevents the corrosion reaction of at the can surface.

This layer of separator material may be wrapped around the outer negative electrode layer as a separate wrap or as a non wettable extension of the hydrophilic separator layer. As the jellyroll is wound, the non-wettable extension of the separator makes a final wrap around the outside of the jellyroll.

The electrodes may be wound in such a way to be slightly offset from each other, where positive electrode and the separator protrudes above the negative electrode and the negative electrode extends below the positive electrode. Such offsetting facilitates contact with the respective current collection disks. The positive electrode substrate, usually a nickel foam, may be folded over the separator sheets and each other to form a nickel foam plate that makes good contact with the positive current collector disk. At the top of the jelly roll, the nickel foam material extends the furthest, then the separator material, and the lowest point would be the negative electrode. As the nickel foam and the separator material are folded over from the perimeter toward the center of the jelly roll, the folded over separator covers the negative electrode tops and prevents the nickel foam from directly contacting the negative electrode. The nickel foam is preferably extended such that nickel foam from each successive wind would contact the foam from the next inner wind to form an overlapping nickel foam plate. In certain embodiments, the nickel foam may be notched carefully at the top edge to facilitate forming of the foam plate and prevent excessive wrinkles while keeping the separator intact.

A positive current collection disk may be placed or attached to the top of the jelly roll in electrical contact with the positive electrode. The positive current collector disk may be made of stainless steel and may be plated with nickel or other material compatible with the nickel positive electrode. One or more metal tabs on a top of the positive current collector disk is attached to a vent assembly. The metal tab may be welded to the vent assembly so as to form a good contact. In between the positive current collector and the top is an o-ring to provide compression and strain relief.

In certain embodiments, the electrical contact to the jelly roll is maintained by the pressure created by a "spring" that has been inserted between the positive current collection disk and the top. The spring may be a steel spring that has been plated with nickel. Alternatively the spring may be substituted for with a pressurized rubber annulus or o-ring that is resistant to the alkaline media. Such materials may be EPDM (Ethylene Propylene Diene Monomer) or Viton® (fluoroelastomer family from DuPont Dow Elastomers, L.L.C.). In other embodiments, the spring may be or include one or more bent sections of the collection disk. In any case sufficient pressure is maintained such that low impedance electrical resistance is maintained between the cap and jellyroll. In certain embodiments, the pressure exerted by the o-ring presses downward through or from a crimp in the cell can.

The vent assembly of the battery cell includes a vent mechanism, a seal gasket, and a bottom plate. The bottom plate may be attached to the positive current collector disk by a weld. The vent mechanism includes a cap having vent holes and a rubber insert that provides pressure relief at pressures above 300 psi, 450 psi, or even up to 600 psi. The cap of the vent mechanism is welded to the bottom at several places. In one example, four welds forming equidistant from a center are made. In other examples, more or fewer welds or the entire periphery of the cap may be welded to the bottom plate.

The seal gasket is fitted around the vent assembly and inserted into the can. The edge of the can is then folded over and crimpled over the seal gasket to close the can. The crimping of the can forms an airtight seal while the seal gasket insulates the can from the vent assembly.

During the cell manufacturing process, a part of the can is beaded. A small circumference of the can above the location of the jelly roll is compressed so that an insulator below the edge of the bead is held in place and prevents contact between the can and the positive electrode material. The bead is also used to encapsulate the seal gasket.

In another aspect, the present invention pertains to a nickel zinc battery cell having a can, a negative current collector disk, a jelly roll, an anticorrosive material layer, a positive current collector disk, and a vent assembly. The anticorrosive material layer may be attached to the inner surface of the can or to the outer wind of the jelly roll. The anticorrosive material may be copper, tin, copper/tin alloy, zinc, silver, conductive carbon, brass, or combinations of these. The anticorrosive material may be a foil, a sheet, a coated layer or a plated layer on the inner surface of the can or the outer surface of the jelly roll.

In order to frame the context for various design features, the electrochemical reactions and the possible by products in a nickel zinc cell is described.

Electrochemical Reactions of Nickel Zinc Batteries

The charging process for a nickel hydroxide positive electrode in an alkaline electrochemical cell is governed by the following reaction:

$$Ni(OH)_2 + OH^- \rightarrow NiOOH + H_2O + e^- \quad (1)$$

The charging efficiency of the positive electrode and the utilization of the positive electrode materials are affected by the oxygen evolution process which is controlled by the reaction:

$$2OH^- \rightarrow H_2O + \tfrac{1}{2}O_2 + 2e^- \quad (2)$$

The oxygen evolution reaction generally begins when the state-of-charge (SOC) reaches to 70-80%. The overcharge of the nickel electrode leads to a decrease of the charging efficiency of the nickel electrode as more charge is diverted to gas evolution. After first charge of the electrochemical cell, the nickel hydroxide is oxidized to form the nickel oxy hydroxide. During discharge of the electrochemical cell, the nickel oxyhydroxide is reduced to form nickel hydroxide. The reversible nickel hydroxide should maintain in a beta-phase structure, but generally, the nickel electrode undergoes some degradation by swelling in the thickness as the number of charge/discharge cycles increases.

Alkaline electrolyte acts as ion carrier in the electrochemical reaction in the Zn electrode. In the rechargeable Zn electrode, the starting active material is the ZnO powder or a mixture of zinc and zinc oxide powder. The ZnO powder dissolves in the KOH solution to form the zincate (Zn(OH)$_4^{2-}$) that is reduced to zinc metal during the charging process. The reaction at the Zn electrode can be written as follows:

$$ZnO + 2OH^- + H_2O \rightarrow Zn(OH)_4^{2-} \quad (3)\text{ and}$$

$$Zn(OH)_4^{2-} + 2e^- \rightarrow Zn + 4OH^- \quad (4)$$

Then, the overall Ni/Zn battery reaction can be expressed as follows:

$$Zn + 2NiOOH + H_2O = ZnO + 2Ni(OH)_2 \quad (5)$$

The charge transfer and mass transfer reactions in the Zn electrode can also be shown in FIG. 1. As shown, in the discharging process of the Zn electrode (shown as arrows going to the right), the zinc metal 101 gives out electrons to form zincate 103. At the same time, the concentration of the zincate in the KOH solution increases. The increase in the zincate concentration leads to a precipitation of zincate to form the ZnO 105. These transformations and agglomerations that occur at the zinc electrode are major factors in the eventual loss in activity of the electrode over many charge discharge cycles. Some of the improvements in Ni—Zn battery technology to eliminate the zincate growth in the separator are disclosed in the patents US20060127761, US20060207084 and EP1819002, each of these documents is incorporated herein by reference in its entirety for all purposes.

General Cell Structure

Figure 2A:
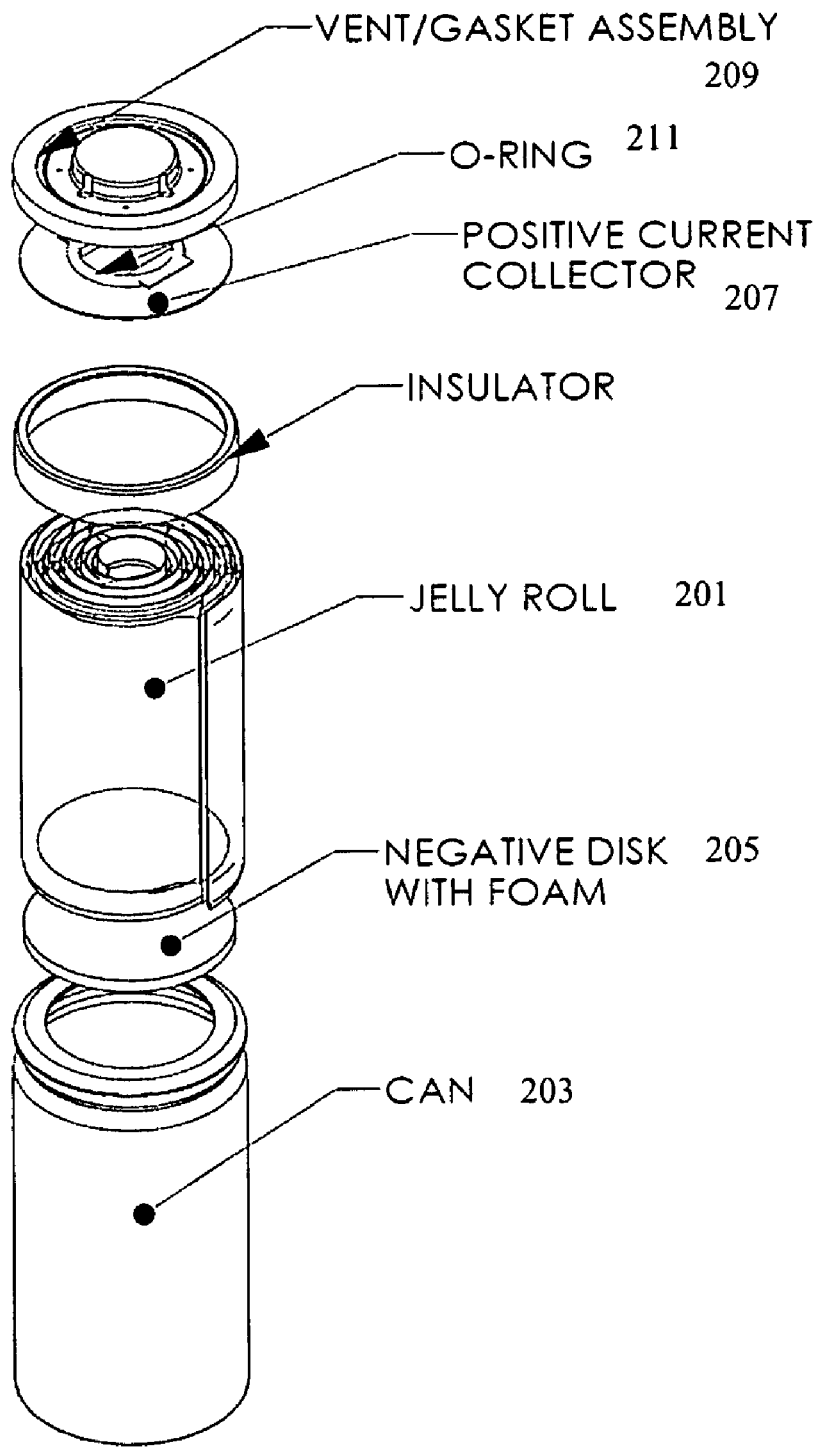
FIG. 2A is an exploded diagram of a cell in accordance with various embodiments of the present invention.
Figure 2B:
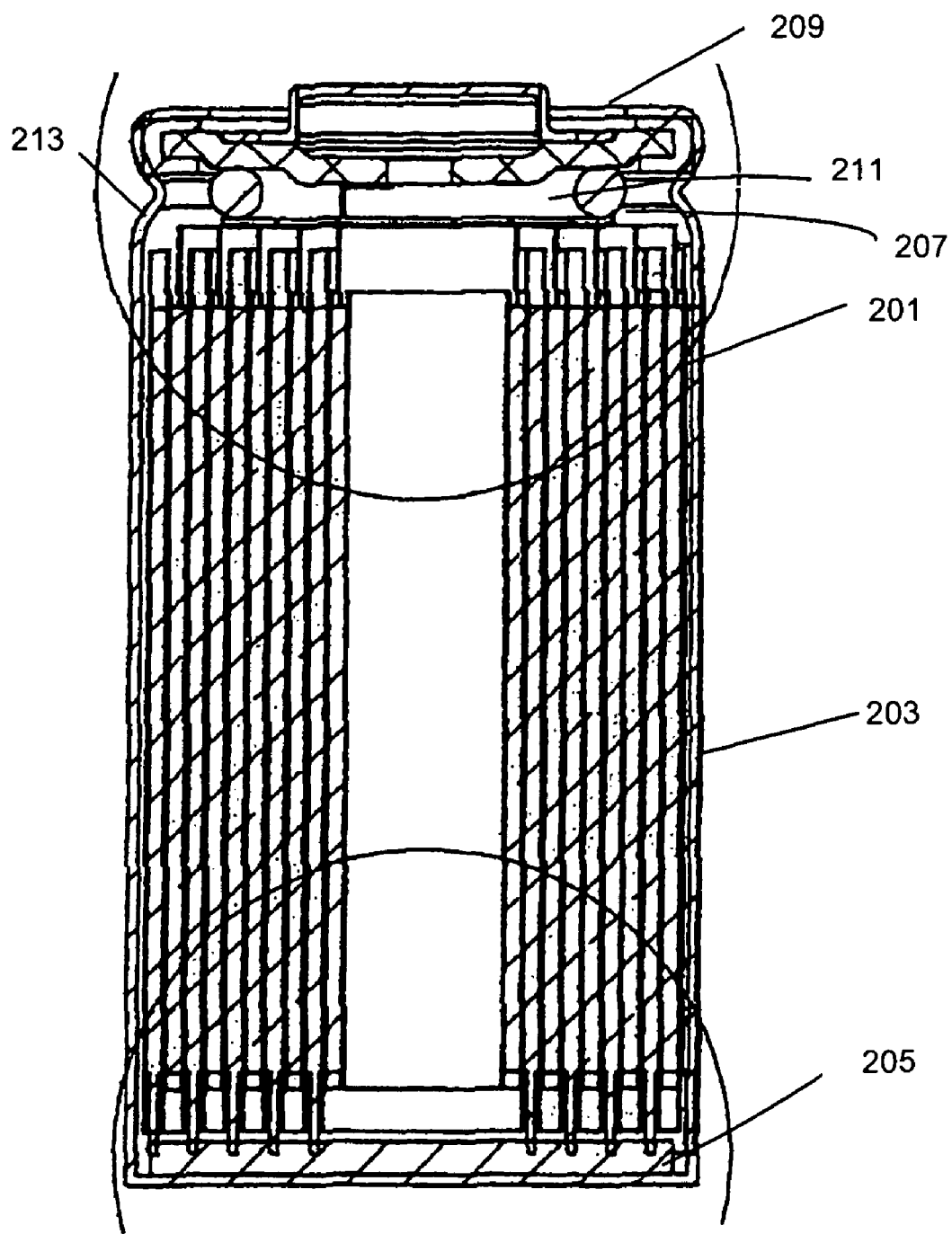
FIG. 2B is a cross-section diagram of a cell in accordance with various embodiments of the present invention.

FIGS. 2A and 2B are graphical representations of the main components of a cylindrical power cell according to an embodiment of the invention, with FIG. 2A showing an exploded view of the cell. Alternating electrode and electrolyte layers are provided in a cylindrical assembly 201 (also called a "jellyroll"). The cylindrical assembly or jellyroll 201 is positioned inside a can 203 or other containment vessel. A negative collector disk 205 and a positive collector disk 207 are attached to opposite ends of cylindrical assembly 201. The negative and positive collector disks function as internal terminals, with the negative collector disk electrically connected to the negative electrode and the positive collector disk electrically connected to the positive electrode. A vent cap as part of vent assembly 209 and the can 203 serve as external terminals. In the depicted embodiment, positive collector disk 207 includes an o-ring 211 for connecting the positive collector disk 207 to vent assembly 209. Negative collector disk 205 is welded or otherwise electrically connected to can 203. An insulator 213 is positioned between the can 203 and a circumferential corner of the jelly roll 201 to electrically insulate the can from any exposed positive electrode on top of the jelly roll. In other embodiments, the positive collector disk connects to the can and the negative collector disk connects to the cap.

The negative and positive collector disks 205 and 207 may be perforated to facilitate bonding to the jellyroll and/or passage of electrolyte from one portion of a cell to another. In other embodiments, the disks may employ slots (radial or peripheral), grooves, or other structures to facilitate bonding and/or electrolyte distribution. In certain embodiments, the negative collector disk is a copper foam. The copper foam may have a metallic backing as support on the side closest to the can bottom. In certain embodiments, a spring mechanism may be positioned between the negative collection disk and the bottom of the can to exert pressure against the jelly roll, thereby ensuring good electrical contact. The spring mechanism would also absorb shocks and vibration during handling and operation.

Figure 3A:
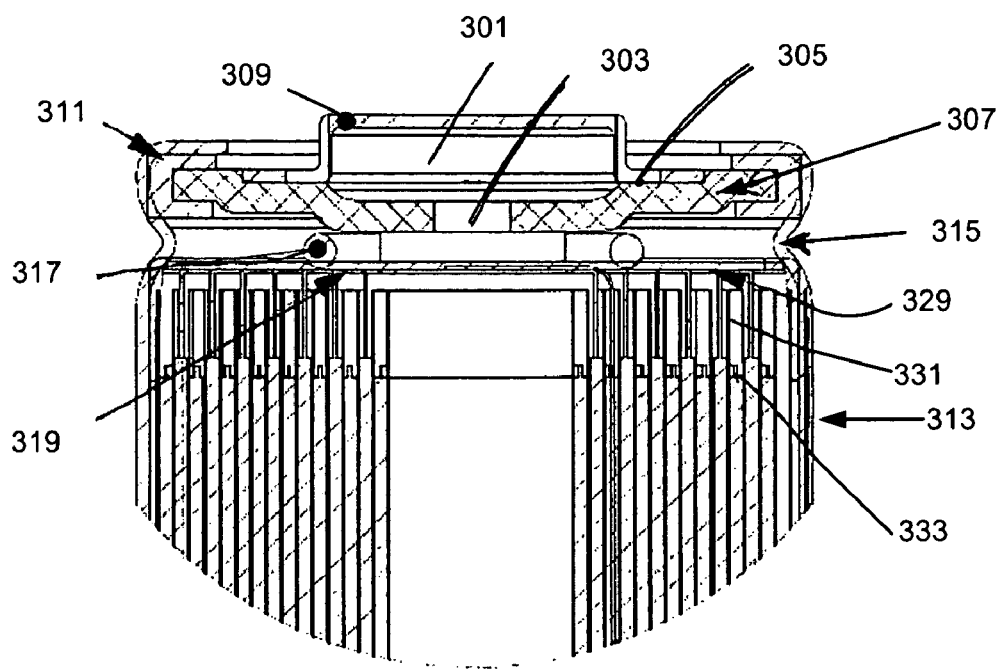
FIGS. 3A and 3B are cross-section diagrams of various parts of a cell a cell in accordance with various embodiments of the present invention.

FIG. 3A is a close-up cross section view of the positive end of the battery cell. A flexible gasket 311 rests on a circumferential bead 315 provided along the perimeter in the upper portion of can 313, proximate to the cap 309. The gasket 311 serves to electrically isolate cap 309 from can 313. In certain embodiments, the bead 315 on which gasket 311 rests is coated with a polymer coating. The gasket may be any material that electrically isolates the cap from the can. Preferably the material does not appreciably distort at high temperatures; one such material is nylon. In other embodiments, it may be desirable to use a relatively hydrophobic material to reduce the driving force that causes the alkaline electrolyte to creep and ultimately leak from the cell at seams or other available egress points. An example of a less wettable material is polypropylene.

After the can or other containment vessel is filled with electrolyte, the vessel is sealed to isolate the electrodes and electrolyte from the environment. The gasket is typically sealed by a crimping process. In certain embodiments, a sealing agent is used to prevent leakage. Examples of suitable sealing agents include bituminous sealing agents, tar and VERSAMID® available from Cognis of Cincinnati, Ohio.

In certain embodiments, the cell is configured to operate in an electrolyte "starved" condition. Further, in certain embodiments, the nickel-zinc cells of this invention employ a starved electrolyte format. Such cells have relatively low quantities electrolyte in relation to the amount of active electrode material. They can be easily distinguished from flooded cells, which have free liquid electrolyte in interior regions of the cell. As discussed in U.S. patent application Ser. No. 11/116,113, filed Apr. 26, 2005, titled "Nickel Zinc Battery Design," hereby incorporated by reference, it may be desirable to operate a cell at starved conditions for a variety of reasons. A starved cell is generally understood to be one in which the total void volume within the cell electrode stack is not fully occupied by electrolyte. In a typical example, the void volume of a starved jellyroll after electrolyte fill may be at least about 10% of the total void volume before fill.

The battery cells of this invention can have any of a number of different shapes and sizes. For example, cylindrical cells of this invention may have the diameter and length of conventional AAA cells, AA cells, A cells, C cells, etc. Custom cell designs are appropriate in some applications. In a specific embodiment, the cell size is a sub-C cell size of diameter 22 mm and length 43 mm. Note that the present invention also may be employed in relatively small prismatic cell formats, as well as various larger format cells employed for various non-portable applications. Often the profile of a battery pack for, e.g., a power tool or lawn tool will dictate the size and shape of the battery cells. This invention also pertains to battery packs including one or more nickel zinc battery cells of this invention and appropriate casing, contacts, and conductive lines to permit charge and discharge in an electric device.

Cell Can

The can is the vessel serving as the outer housing or casing of the final cell. In conventional nickel-cadmium cells, where the can is the negative terminal, it is typically nickel-plated steel. For a nickel-zinc cell, the can material may be of a composition similar to that employed in a conventional nickel cadmium battery, such as steel, as long as the material is coated with another material compatible with the potential of the zinc electrode. For example, a negative can may be coated with an anticorrosive material such as copper and others described above to prevent corrosion. The can is typically fabricated by drawing or stamping the shape of the can into a sheet metal material. This sheet metal material may include an anticorrosive material applied to the sheet metal. For example, the anticorrosive material may be cladded, welded, rolled, or drawn onto the sheet metal before the cans are fabricated.

Venting Cap

Although the cell is generally sealed from the environment, the cell may be permitted to vent gases from the battery that are generated during charge and discharge. A typical nickel cadmium cell vents gas at pressures of approximately 200 Pounds per Square Inch (PSI). In some embodiments, a nickel zinc cell of this invention is designed to operate at this pressure and even higher (e.g., up to about 300 PSI) without the need to vent. This may encourage recombination of any oxygen and hydrogen generated within the cell. In certain embodiments, the cell is constructed to maintain an internal pressure of up to about 450 PSI and or even up to about 600 PSI. In other embodiments, a nickel zinc cell is designed to vent gas at relatively lower pressures. This may be appropriate when the design encourages controlled release of hydrogen and/or oxygen gases without their recombination within the cell.

Figure 4:
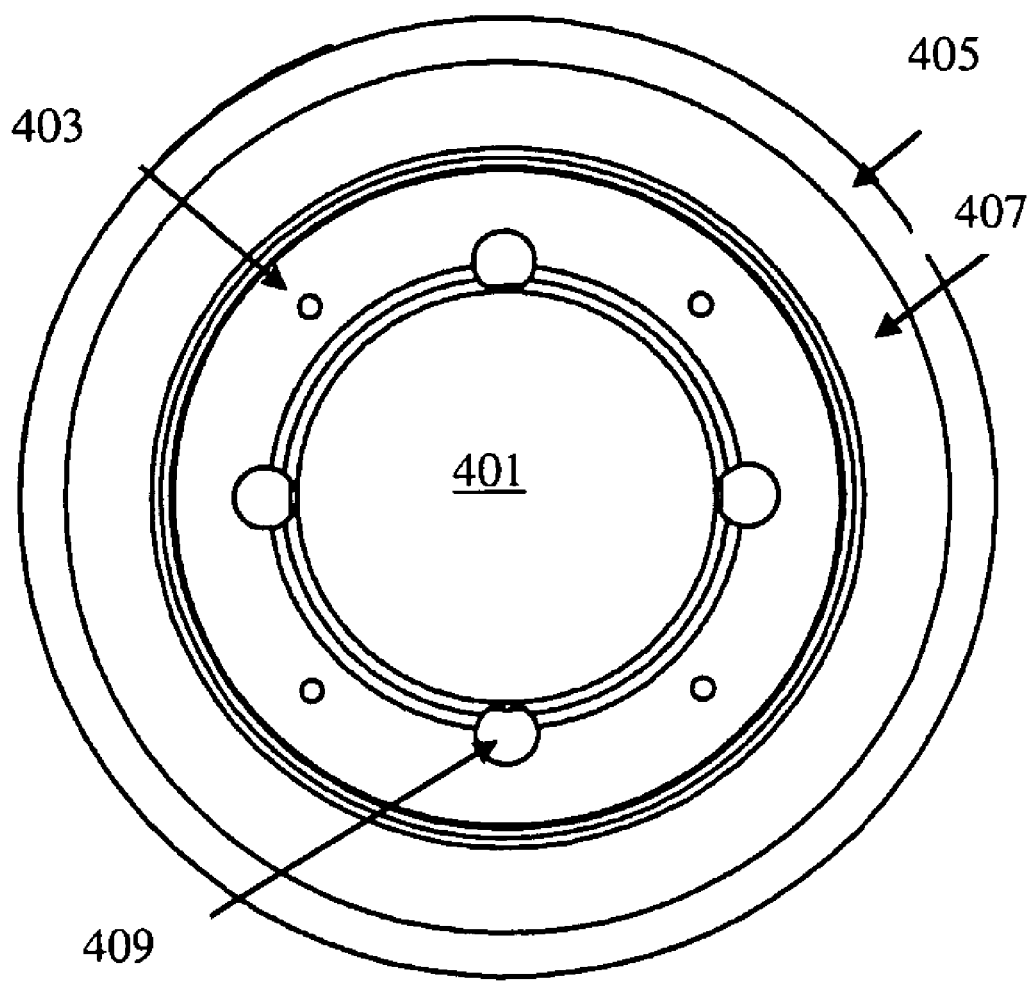
FIG. 4 is a diagram of a vent cap from top of the cell.

FIG. 3A and FIG. 4 are a representation of a vent cap and vent mechanism according to one embodiment of the invention. FIGS. 3A and 4 show the vent assembly including vent cap 309/401, seal gasket 311, and bottom plate 307/407. The vent mechanism is preferably designed to allow gas but not electrolyte to escape. Cap 309/401 includes a plate 307/407 that rests on the gasket. Plate 307/407 includes a hole 303 that permits gas to escape through vent holes 409. Vent seal 301 covers hole 303 and is displaced by escaping gas. Vent seal 301 is typically rubber, though it may be made of any material that permits gas to escape and withstands high temperatures. A square vent has been found to work well.

FIG. 4 shows a top view of the vent assembly. Vent cap 309 is welded to plate 407 at weld spots 403 and includes holes 409 to allow the gas to escape. The locations of weld spots 403 and 409 shown are purely illustrative and these may be at any suitable location. In a preferred embodiment, the vent mechanism includes a vent seal 301 made of a hydrophobic gas permeable membrane. Examples of vent cover materials include microporous polypropylene, microporous polyethylene, microporous PTFE, microporous FEP, microporous fluoropolymers, and mixtures and co-polymers thereof (see e.g., U.S. Pat. No. 6,949,310 (J. Phillips), "Leak Proof Pressure Relief Valve for Secondary Batteries," issued Sep. 27, 2005, which is incorporated herein by reference for all purposes). The material should be able to withstand high temperatures. In certain embodiments, hydrophobic gas permeable membranes are used in conjunction with a tortuous gas escape route. Other battery venting mechanisms are known in the art and are suitable for use with this invention. In certain embodiments, a cell's materials of construction are chosen to provide regions of hydrogen egress. For example, the cells cap or gasket may be made from a hydrogen permeable polymeric material. In one specific example, the outer annular region of the cell's cap is made from a hydrogen permeable material such as an acrylic plastic or one or more of the polymers listed above. In such embodiments, only the actual terminal (provided in the center of the cap and surrounded by the hydrogen permeable material) need be electrically conductive.

Components of the Negative Pathway

Figure 3B:
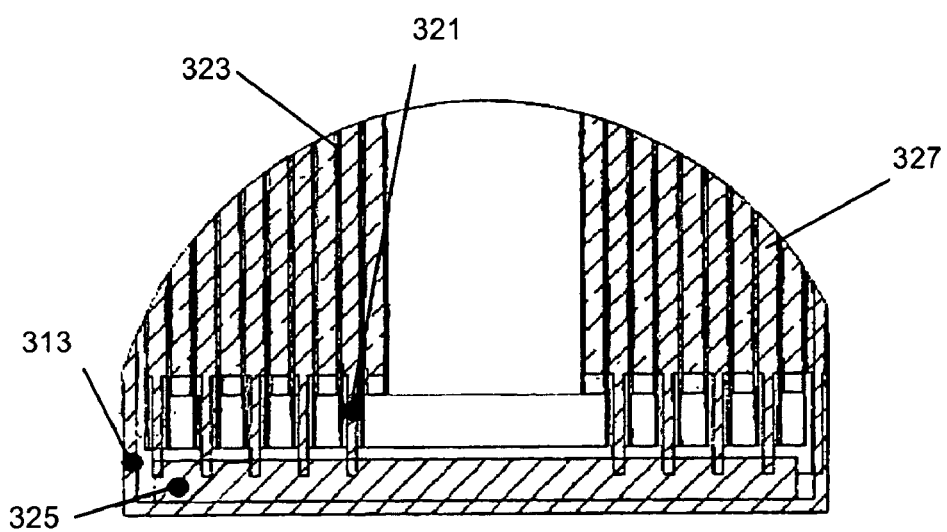

FIG. 3B shows some components of the negative pathway, such as negative electrode substrate 321, negative current collector disk 325, and cell can 313. These components may be made from any of the base metals for the current collection substrate. In certain embodiments, the negative electrode substrate is copper expanded metal, e.g., about 15 mils thick. In one embodiment, the copper expanded metal is turned over at the bottom to make a contact surface with the negative collection disk. The base material chosen for the disk and/or can should be highly conductive and inhibit the evolution of hydrogen, etc. In certain embodiments, one or both of the disk and the can employs zinc or a zinc alloy as a base metal. In certain embodiments, the current collector disk and/or the can is a copper or copper alloy sheet or foam coated with zinc or an alloy of zinc containing, e.g., tin, silver, indium, lead, or a combination thereof. It may be desirable to pre-weld the current collector disk and jelly roll or employ a jelly roll that is an integral part of the current collector disk and spring mechanism that could be directly welded to the bottom. Such embodiments may find particular value in relatively low rate applications. In the example shown as FIG. 3B, the negative current collector disk 325 is a copper foam. As shown, the negative electrode substrate 321 extends into the foam forming good electrical contact with the foam material. Also shown is separator material 323 that also extends beyond the bottom of negative active material 327 but does not extend into the foam material. These embodiments are particularly useful when the collector disk contains zinc. The jelly roll may include a tab (not shown) welded to one side of the negative electrode to facilitate contact with the collector disk.

Figure 5:
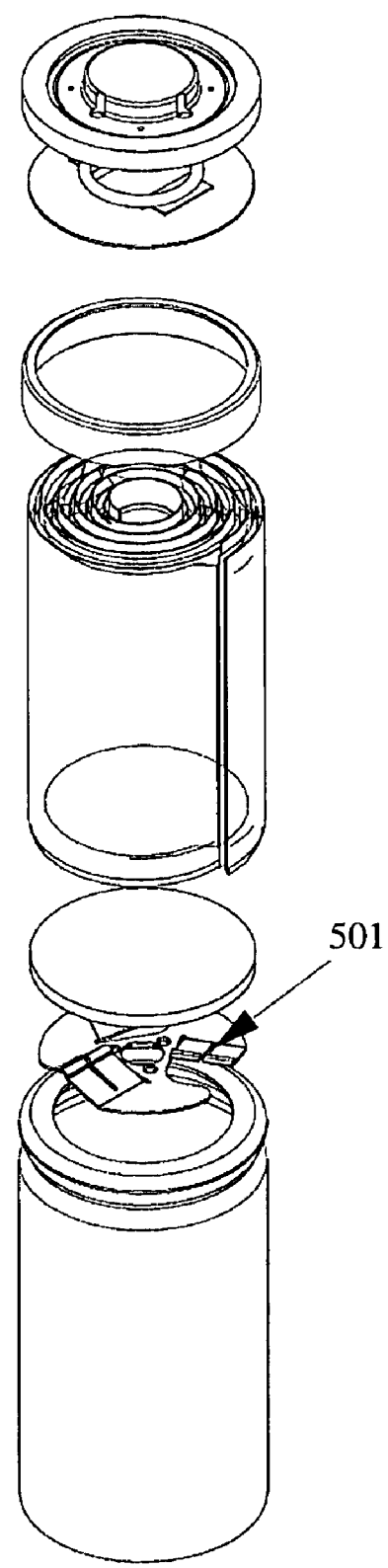
FIG. 5 is an exploded view of an example cell design in accordance with various embodiments of the present invention.

In certain embodiments, the negative current collector disk may include a spring mechanism positioned between the disk portion at the bottom of the can and the jellyroll such as shown in FIG. 5. The spring 501 may use bent or folded over metallic tabs or wipers to give pressure against the negative current collector. The spring mechanism may also use non-metallic material such as that of an o-ring discussed above to provide the pressure. The spring portions of the negative current collector disk may be applied with the same or different anticorrosive material as the disk portion.

It has been found that regular cans without proper anticorrosion plating (e.g., tin, lead, silver, zinc, indium, etc.) can cause zinc to corrode during storage, resulting in leakage, gassing, and reduced shelf life. In some cases, the entire negative electronic pathway (including the terminal and one or more current collection elements) is made from the same material, e.g., zinc or copper coated with zinc. In a specific embodiment, the entire electronic pathway from the negative electrode to the negative terminal (current collector substrate, current collector disk, tab, and cap) is zinc plated copper or brass. Some details of the structure of a vent cap and current collector disk, as well as the carrier substrate itself, are found in the following patent applications which are incorporated herein by reference for all purposes: PCT/US2006/015807 filed Apr. 25, 2006 and PCT/US2004/026859 filed Aug. 17, 2004 (publication WO 2005/020353 A3).

Components of the Positive Pathway

Figure 6:
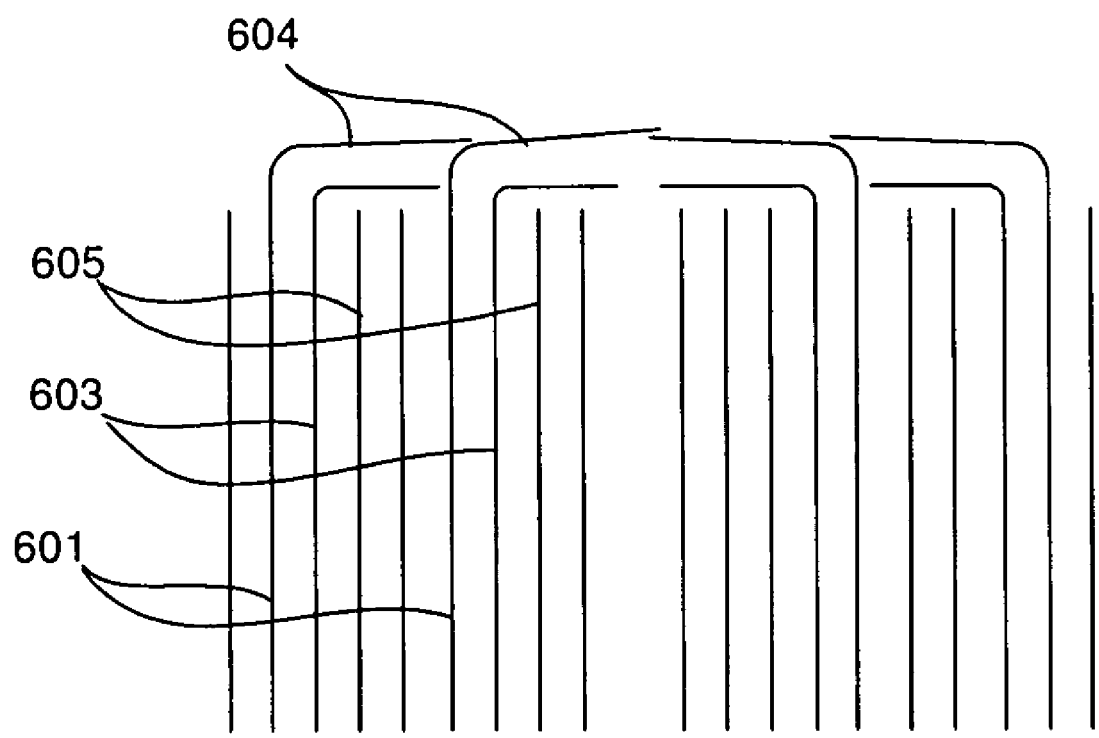
FIG. 6 is a schematic of the relative positions of the jelly roll components in accordance with various embodiments of the present invention.

FIG. 3A shows some components of the positive pathway, such as a positive electrode substrate 329, positive current collection disk 319, and vent assembly including vent cap 309. The positive electrode substrate 329 is typically a nickel foam. As shown in FIG. 3A, the positive electrode substrate 329 extends above the separator sheets 331 and the top of positive active material 333. FIG. 6 is a schematic of the relative positions of the jelly roll components. As discussed above, the positive and negative electrode materials are placed in layers with one or more separator material in between. A mechanism then winds the layers into a jelly roll. FIG. 6 shows about two winds of a jelly roll toward the positive end. Separator material 603 is positioned in between the negative electrode material 605 and positive electrode material 601. The positive electrode substrate 604 extends above the negative electrode 605 and is folded over above the separator layer 603. The folded positive electrode substrate 604 preferably overlaps the positive substrate from an inner wind, as shown. The separator 603 insulates the two types of electrodes from each other and does not allow any direct contact between the positive substrate 604 and the negative electrode 605. In certain embodiments, the positive substrate 604 may be notched to facilitate the folding over without creating excessive wrinkles. Care is taken during folding not to perforate the separator. The folding technique creates a plate of positive substrate 604 which makes excellent electrical contact with the positive current collector. The positive substrate fold occurs at the level of the bead of the can. In the reverse polarity design, the negative terminal exists at the same location. However, without a similar folding over of the negative substrate contact in the area under the bead is restricted. To enhance contact it may be necessary to add a plate or annulus under the bead. This plate can then be contacted by the collector spring or appropriate contact mechanism.

The Electrolyte

The electrolyte should possess a composition that limits dendrite formation and other forms of material redistribution in the zinc electrode. One that appears to meet the criterion is described in U.S. Pat. No. 5,215,836 issued to M. Eisenberg on Jun. 1, 1993, which is hereby incorporated by reference. Furthermore, an example of a preferred electrolyte includes (1) an alkali or earth alkali hydroxide present in an amount to produce a stoichiometric excess of hydroxide to acid in the range of about 2.5 to 11 equivalents per liter, (2) a soluble alkali or earth alkali fluoride in an amount corresponding to a concentration range of about 0.01 to 1 equivalents per liter of total solution, and (3) a borate, arsenate, and/or phosphate salt (e.g., potassium borate, potassium metaborate, sodium borate, sodium metaborate, and/or a sodium or potassium phosphate). In one specific embodiment, the electrolyte comprises about 4.5 to 10 equiv/liter of potassium hydroxide, from about 2 to 6 equiv/liter boric acid or sodium metaborate and from about 0.01 to 1 equivalents of potassium fluoride. A specific preferred electrolyte for high rate applications comprises about 8.5 equiv/liter of hydroxide, about 4.5 equivalents of boric acid and about 0.2 equivalents of potassium fluoride.

The invention is not limited to the electrolyte compositions presented in the Eisenberg patent. Generally, any electrolyte composition meeting the criteria specified for the applications of interest will suffice. Assuming that high power applications are desired, then the electrolyte should have very good conductivity. Assuming that long cycle life is desired, then the electrolyte should resist dendrite formation. In the present invention, the use of borate and/or fluoride containing KOH electrolyte along with appropriate separator layers reduces the formation of dendrites thus achieving a more robust and long-lived power cell.

In a specific embodiment, the electrolyte composition includes an excess of between about 3 and 5 equiv/liter hydroxide (e.g., KOH, NaOH, and/or LiOH). This assumes that the negative electrode is a zinc oxide based electrode. For calcium zincate negative electrodes, alternate electrolyte formulations may be appropriate. In one example, an appropriate electrolyte for calcium zincate has the following composition: about 15 to 25% by weight KOH, about 0.5 to 5.0% by weight LiOH.

According to various embodiments, the electrolyte may comprise a liquid and a gel. The gel electrolyte may comprise a thickening agent such as CARBOPOL® available from Noveon of Cleveland, Ohio. In a preferred embodiment, a fraction of the active electrolyte material is in gel form. In a specific embodiment, about 5-25% by weight of the electrolyte is provided as gel and the gel component comprises about 1-2% by weight CARBOPOL®.

In some cases, the electrolyte may contain a relatively high concentration of phosphate ion as discussed in U.S. patent application Ser. No. 11/346,861, filed Feb. 1, 2006 and incorporated herein by reference for all purposes.

CONCLUSION

The conventional polarity design for the nickel-zinc battery cell disclosed herein has several advantages over the reverse polarity design while maintaining the advantages of nickel-zinc battery cells over other alkaline secondary cells. Better electrical and thermal contacts between the negative electrode and the negative terminal is achieved by the negative electrode directly contacting the inner surface of the cell can, instead of having a layer of separator surrounding the jelly roll. Removal of this layer of separator also creates more space in the jelly roll for electrochemically active material, increasing the capacity and energy available for the same size cell.

The folding of the positive substrate at the bead level provides excellent electrical connectivity without additional disc or annulus as required in the reverse polarity design. The battery cell cost is decreased by using reduced separator material as discussed above.

Lastly, the conventional polarity design reduces the likelihood of electrolyte leakage. Electrolytes tend to follow the negative pathway. In the reverse polarity design, the negative pathway leads to a vent cap where electrolytes can potentially seep around the vent seal over time. In the conventional polarity design the negative pathway does not lead to any opening where electrolyte have the potential to escape.

What is claimed is:

1. A nickel-zinc rechargeable battery cell, the battery comprising:
   (a) a base metal can having a bottom and a cylindrical side, said base metal can comprising a first anticorrosive material coated, plated or clad onto the base metal can or residing between the base metal can and electrode material, the first anticorrosive material selected from the group consisting of tin, copper/tin alloy, zinc, silver, conductive carbon, brass, a non-wettable polymer layer and combinations thereof;
   (b) a negative current collector disk disposed at the bottom of the can and in electrical contact with the can;
   (c) a jelly roll comprising a positive electrode, a negative electrode, and one or more separators in between, said jelly roll is disposed above the negative current collector disk and said negative electrode is in electrical contact with the negative current collector disk;
   (d) a positive current collector disk disposed above of the jelly roll and in electrical contact with the positive electrode;
   (e) a vent assembly disposed on top of the positive current collector disk, said vent assembly is electrically connected with the positive current collector disk and electrically insulated from the can; and
   (f) an alkaline electrolyte.

2. The cell of claim 1, wherein the first anticorrosive material is zinc.

3. The cell of claim 1, wherein the negative current collector disk comprises copper.

4. The cell of claim 3, wherein the negative current collector disk is coated with a second anticorrosive material.

5. The cell of claim 4, wherein the second anticorrosive material is selected from the group consisting of tin, copper/tin alloy, zinc, silver, conductive carbon, brass, and combinations thereof.

6. The cell of claim 1, further comprising a spring mechanism disposed in between the negative current collector disk and the bottom of the can, said spring mechanism configured to absorb shock and vibration of the can.

7. The cell of claim 1, wherein an outer layer of the jelly roll is the negative electrode.

8. The cell of claim 7, wherein the outer layer electrically contacts the can.

9. The cell of claim 1, wherein the can includes a beaded area above the jelly roll.

10. The cell of claim 9, further comprising an insulator disposed above the jelly roll against the can below the beaded area.

11. The cell of claim 1, wherein the positive electrode of the jelly roll comprises a nickel foam and a positive active material, said nickel foam folded over at the positive end of the jelly roll and lies between the positive current collector disk and the jelly roll, wherein the fold of each wind of the nickel foam overlaps another and the separator, such that the nickel foam forms a plate and does not electrically contact with the negative electrode.

12. The cell of claim 1, wherein the vent assembly comprises a vent seal made of a hydrophobic gas permeable membrane.

13. The cell of claim 1, wherein one or more tabs of the positive current collector disk are welded to the vent assembly.

14. The cell of claim 1, wherein the vent assembly comprises a vent cap and a seal gasket, said seal gasket is not conductive and electrically insulates the vent assembly from the can.

15. The cell of claim 7, wherein the first anticorrosive material is the non-wettable polymer layer attached to the outer layer of the jelly roll.

16. The cell of claim 15, wherein the first anticorrosive material is attached to the separator extending beyond the last winding of the negative electrode.

17. The cell of claim 15, wherein the first anticorrosive material comprises one or more hydrophobic polymer sheets.

18. The cell of claim 17, wherein said one or more hydrophobic polymer sheets comprise a polyolefin microporous membrane.

* * * * *